UNITED STATES PATENT OFFICE 2,202,865

DIALKYLAMINOBENZOATES AND PROCESS OF MAKING THEM

Henry Alfred Piggott and Clarence Sydney Woolvin, Blackley, Manchester, England, assignors to Imperial Chemical Industries Limited, a corporation of Great Britain No Drawing. Original application February 9, 1937, Serial No. 124,922. Divided and this application July 13, 1938, Serial No. 219,096. In Great Britain February 12, 1936

15 Claims. (Cl. 260—471)

This invention relates to the manufacture of new dialkylaminobenzoates.

This application is a division of our copending application, Serial No. 124,922, filed February 9, 1937.

This invention has as an object to devise a method of manufacturing new dialkylaminobenzoates. A further object is to produce new aromatic tertiary ammonium compounds. A still further object is to produce new reagents from which new quaternary ammonium compounds can be prepared. Further objects will appear hereafter.

These objects are achieved by the following invention. We have found that we can manufacture new quaternary ammonium salts by interacting a dialkylaminobenzoate of the general formula

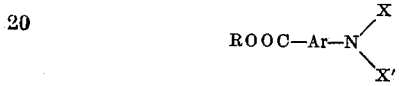

where Ar represents a residue of the benzene series, X and X' each represent a lower alkyl (methyl to butyl) radicle and R represents a long chain aliphatic hydrocarbon radicle having 12 to 18 carbon atoms, with an alkyl ester of an inorganic acid or of an organic sulfonic acid. The new quaternary ammonium salts mentioned herein are more particularly described and claimed in our parent application, Serial No. 124,922, filed February 9, 1937.

In manufacturing new quaternary ammonium salts from the aforesaid dialkylaminobenzoates, interaction is conveniently brought about by heating the defined reagents together at moderately raised temperatures, for example, 90°–100° C. In most cases the reaction mixture is fluid at such temperatures, and the use of an inert liquid diluent is not necessary, but such a diluent, for example, a hydrocarbon such as toluene, may be present if desired.

The dialkylaminobenzoates of the general formula hereinbefore given are, as will be seen, esters of aliphatic alcohols having 12 to 18 carbon atoms. These alcohols which are used as starting materials in the making of the dialkylaminobenzoates of the present invention, comprise dodecyl alcohol, otherwise known as dodecanol, tetradecyl alcohol, hexadecyl alcohol, octadecyl alcohol, all of which are saturated. Hexadecyl alcohol is the main or sole component of the alcohols obtained by the saponification of spermaceti. If the alcohol obtained by the saponification of spermaceti is regarded as hexadecyl alcohol, its purity will depend upon the purity of the spermaceti which has been saponified. With low grade spermaceti the alcohol obtained is a mixture which may contain also oleyl alcohol. When the term cetyl alcohol is used in this specification, it will be understood that it does not necessarily refer to pure cetyl alcohol.

The dialkylaminobenzoates of the general formula set forth above are new compounds which the readily prepared by applying the methods hereinafter indicated.

The new quaternary ammonium salts manufactured from these dialkylaminobenzoates are solids which dissolve in water to give foaming solutions. On warming these aqueous solutions with alkali the foaming power disappears, and the solutions become turbid or opalescent. The salts are unstable to alkali and slowly decompose.

The invention is illustrated but not limited by the following examples, in which the parts are by weight.

Example I

Cetyl p-dimethylaminobenzoate is made by reacting 18.4 parts of p-dimethylaminobenzoyl chloride with 25 parts of cetyl alcohol in the presence of 70 parts of dimethylaniline at 100° C. for 18 hours and then removing the dimethylaniline from the reaction product by washing with dilute hydrochloric acid. When crystallized from methanol, cetyl p-dimethylaminobenzoate is a crystalline solid m. p. 66–67° C. and has the formula

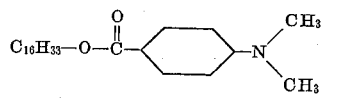

When this compound is reacted with dimethyl sulfate, a new quaternary ammonium salt is prepared which is more fully described in Example 1 of our parent application, Serial No. 124,922.

Example II

Dodecyl p-dimethylaminobenzoate was prepared as follows: A solution of p-dimethylamino benzoyl chloride in dimethylaniline was prepared by passing phosgene into 976 parts of dimethylaniline at below 20° C. until the increase in weight indicated that 200 parts of phosgene had been taken up. After standing for 18 hours, during which time the temperature of the solution rose to 80° C. and then slowly fell to room temperature, 488 parts of dimethylaniline and 221 parts of dodecyl alcohol were added, and the mixture heated at 100° C. for 4 hours. The reaction mixture was then poured into 5,000 parts of aqueous 2N hydrochloric acid, and the whole was then cooled to atmospheric temperature and extracted with ether. The ether extract was washed with water, then with dilute aqueous sodium carbonate to remove any traces of excess hydrochloric acid, finally dried with anhydrous magnesium sulfate, and the ether evaporated off. The oily residue was purified by crystallization from methyl alcohol whereby dodecyl p-dimethylaminobenzoate was obtained in the form of colorless crystals, m. p. 50° C. having the formula

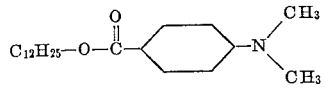

By reaction of this compound with dimethyl sulfate a new quaternary ammonium compound is prepared which is more fully described in Example 2 of our parent application, Serial No. 124,922.

*Example III*

Cetyl p-diethylaminobenzoate, m. p. 46°–48° C., is prepared from diethylaniline, phosgene and cetyl alcohol in a manner similar to that already described for the preparation of dodecyl p-dimethylaminobenzoate and has the formula

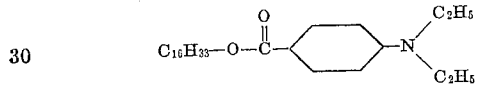

By reacting this compound with dimethyl sulfate a new quaternary ammonium salt may be prepared which is more fully described in Example 3 of our parent application, Serial No. 124,922.

*Example IV*

Oleyl p-dimethylaminobenzoate is prepared by reacting technical oleyl alcohol with p-dimethylaminobenzoyl chloride in dimethylaniline. It is a golden yellow oil, b. p 240°–275° C./3 mm. and has the formula

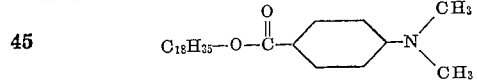

where $C_{18}H_{35}$ stands for the radicle of oleyl alcohol. By heating this compound with dimethyl sulfate a new quaternary ammonium salt may be prepared which is more fully described in Example 4 of our parent application, Serial No. 124,922.

*Example V*

Cetyl p-diethylamino-o-toluate is prepared by first interacting phosgene with an excess of 3-diethylaminotoluene and then reacting the product with cetyl alcohol. It melts at 51°–53° C. and has the formula

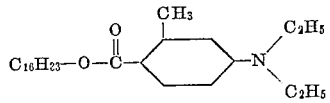

By heating this compound with dimethyl sulfate there is obtained a new quaternary ammonium compound which is described in Example 5 of our parent application, Serial No. 124,922.

*Example VI*

Cetyl p-methylbutylaminobenzoate, m. p. 50°–52° C., is obtained by reacting phosgene with an excess of N-methylbutylaniline and then reacting the so-obtained N-methylbutylaniline solution of p-N-methylbutylaminobenzoyl chloride with cetyl alcohol. It has the formula

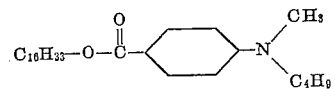

By heating this compound with dimethyl sulfate there is obtained a new quaternary ammonium compound which is described in Example 7 of our parent application, Serial No. 124,922.

The invention is not limited to the use of esters of the alcohols mentioned above altho for economic reasons we prefer to use alcohols with an even number of carbon atoms. Dodecyl and tetradecyl alcohols are obtainable by reduction of the fatty acids obtained from coconut oil and palm oil. Other alcohols, e. g. "olein" or oleyl alcohol (better to be known as octadecenol) are likewise obtainable by reduction of the fatty acids of natural fats and oils (see here, for instance, Bouveault and Blanc, Bull. Soc. Chim., Series 3, vol. 31, page 1, pages 674 and 1210). The invention contemplates the use of the said esters of any of these alcohols, whether in the pure state or as obtained as mixtures from the fatty acids of natural fats and oils. Convenient alternative description of the said esters is accordingly that they are those of primary alcohols resulting from the reduction of the fatty acid radicles of natural fats and oils or from the saponification of waxes.

As many apparently widely different embodiments of this invention may be made without departing from the spirit and scope thereof, it is to be understood that we do not limit ourselves to the specific embodiments thereof except as defined in the appended claims.

We claim:

1. New dialkylaminobenzoates having the general formula:

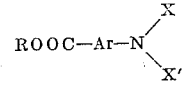

wherein R represents a straight chain primary aliphatic hydrocarbon group containing from 12 to 18 carbon atoms, Ar denotes an aromatic radical of the benzene series selected from the class consisting of phenylene and methyl phenylene radicals, and X and X' each represent a lower alkyl group containing from 1 to 4 carbon atoms.

2. A process of making the new dialkylaminobenzoates defined in claim 1 which comprises reacting a straight chain primary aliphatic alcohol containing from 12 to 18 carbon atoms with a dialkylaminobenzoyl chloride having the general formula:

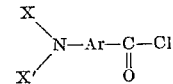

wherein X and X' each represent a lower alkyl group containing from 1 to 4 carbon atoms, and Ar denotes an aromatic radical of the benzene series selected from the class consisting of phenylene and methyl phenylene radicals.

3. New dialkylaminobenzoates having the general formula:

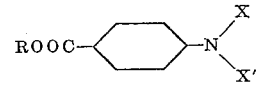

wherein R represents a straight chain primary aliphatic hydrocarbon group containing from 12 to 18 carbon atoms, and X and X' each represent an alkyl group containing from 1 to 2 carbon atoms.

4. A process of making the new dialkylaminobenzoates defined in claim 3 which comprises reacting a straight chain primary aliphatic alcohol containing from 12 to 18 carbon atoms with a dialkyl aniline solution of a dialkylaminobenzoyl chloride having the general formula:

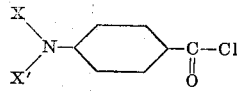

wherein X and X' each represent an alkyl group containing from 1 to 2 carbon atoms.

5. New dialkylaminobenzoates having the general formula:

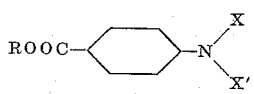

wherein R represents a straight chain primary aliphatic hydrocarbon group containing from 16 to 18 carbon atoms, and X and X' each represent an alkyl group containing from 1 to 2 carbon atoms.

6. A process of making the new dialkylaminobenzoates defined in claim 5 which comprises heating a straight chain primary aliphatic alcohol containing from 16 to 18 carbon atoms with a dialkyl aniline solution of a dialkylaminobenzoyl chloride having the general formula:

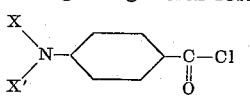

wherein X and X' each represent an alkyl group containing from 1 to 2 carbon atoms.

7. Cetyl p-diethylaminobenzoate which has the formula:

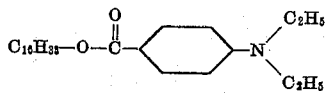

8. A process for making cetyl p-diethylaminobenzoate which comprises heating cetyl alcohol with p-diethylaminobenzoyl chloride in the presence of diethyl aniline, pouring the reaction mixture into dilute hydrochloric acid, extracting with ether, washing and drying the ether extract, and evaporating the ether.

9. New dimethylaminobenzoates having the general formula:

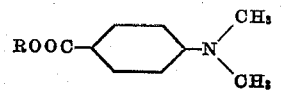

wherein R represents a straight chain primary aliphatic hydrocarbon group containing from 12 to 18 carbon atoms.

10. A process of making the new dimethylaminobenzoates defined in claim 9 which comprises heating a straight chain primary aliphatic alcohol containing from 12 to 18 carbon atoms with a dimethyl aniline solution of p-dimethylamino benzoyl chloride.

11. Cetyl p-dimethylaminobenzoate which has the formula:

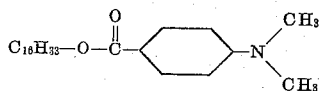

12. A process for making cetyl p-dimethylaminobenzoate which comprises heating cetyl alcohol with p-dimethylaminobenzoyl chloride in the presence of dimethyl aniline and then removing the dimethyl aniline from the reaction product by washing with dilute hydrochloric acid.

13. Oleyl p-dimethylaminobenzoate which has the formula:

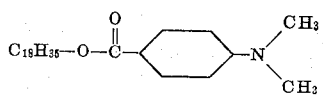

wherein $C_{18}H_{35}$ stands for the hydrocarbon radical of oleyl alcohol.

14. A process for making oleyl p-dimethylaminobenzoate which comprises heating technical oleyl alcohol with p-dimethylaminobenzoyl chloride in the presence of dimethyl aniline.

15. New dialkylaminobenzoates having the general formula:

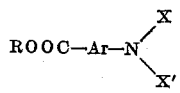

wherein R represents a straight chain primary aliphatic hydrocarbon group containing from 16 to 18 carbon atoms, Ar denotes an aromatic radical of the benzene series selected from the class consisting of phenylene and methyl phenylene radicals and X and X' each represent a lower alkyl group containing from 1 to 4 carbon atoms.

HENRY ALFRED PIGGOTT.
CLARENCE SYDNEY WOOLVIN.